No. 713,786. Patented Nov. 18, 1902.
T. MIDGLEY.
METALLIC VEHICLE WHEEL.
(Application filed Sept. 22, 1902.)
(No Model.) 3 Sheets—Sheet 1.

Witnesses
F. L. Ourand
W. Parker Reinohl

Inventor
Thomas Midgley.
By D. P. Reinohl
Attorney

No. 713,786. Patented Nov. 18, 1902.
T. MIDGLEY.
METALLIC VEHICLE WHEEL.
(Application filed Sept. 22, 1902.)
(No Model.) 3 Sheets—Sheet 2.
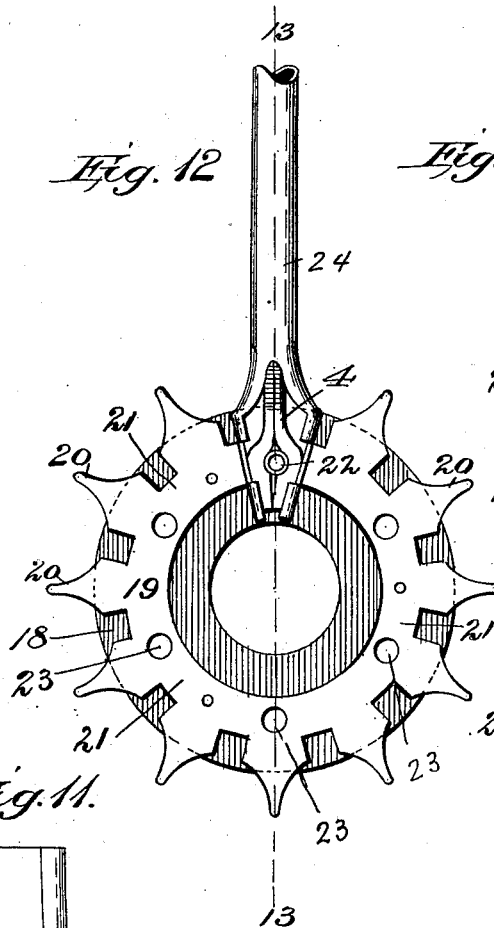
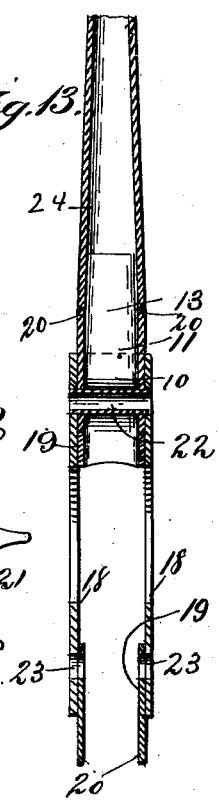
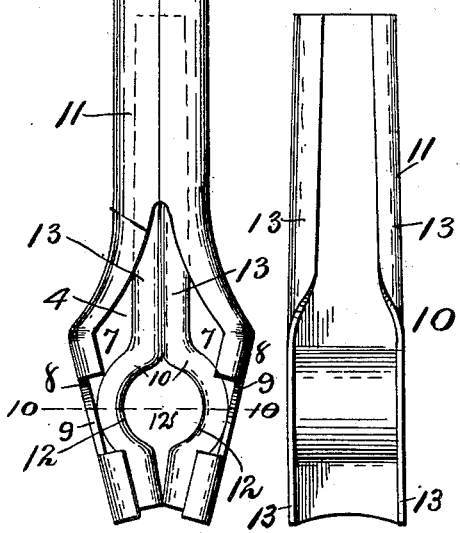
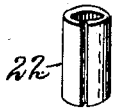
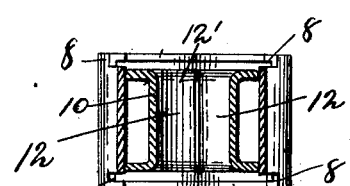
Witnesses
F. L. Durand
W. Parker Reinohl
Inventor
Thomas Midgley
By D. P. Reinohl
Attorney No. 713,786. Patented Nov. 18, 1902.
T. MIDGLEY.
METALLIC VEHICLE WHEEL.
(Application filed Sept. 22, 1902.)

(No Model.) 3 Sheets—Sheet 3.

Witnesses
F. L. Ourand
W. Parker Reinohl

Inventor
Thomas Midgley.
By D. P. Reinohl
Attorney

UNITED STATES PATENT OFFICE.

THOMAS MIDGLEY, OF COLUMBUS, OHIO, ASSIGNOR TO THE MIDGLEY MANUFACTURING COMPANY, OF COLUMBUS, OHIO, A CORPORATION OF OHIO.

METALLIC VEHICLE-WHEEL.

SPECIFICATION forming part of Letters Patent No. 713,786, dated November 18, 1902.

Application filed September 22, 1902. Serial No. 124,461. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Vehicle-Wheels; and I do hereby declare the following to be a full, clear, and exact description of the invention, such as will enable others skilled in the art to which it appertains to make and use the same.

My invention relates to metallic vehicle-wheels for general use—such as automobiles, locomobiles, and vehicles of any preferred type—has for its object the production of a strong and durable wheel, and it consists in certain improvements in construction, which will be fully disclosed in the following specification and claims.

Figure 1:
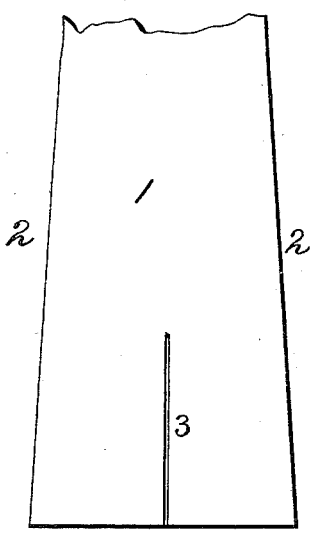
Figure 2:
Figure 3:
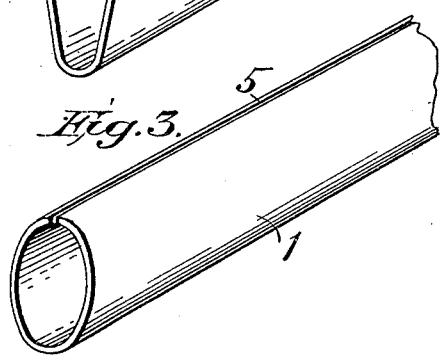
Figures 4, 5:
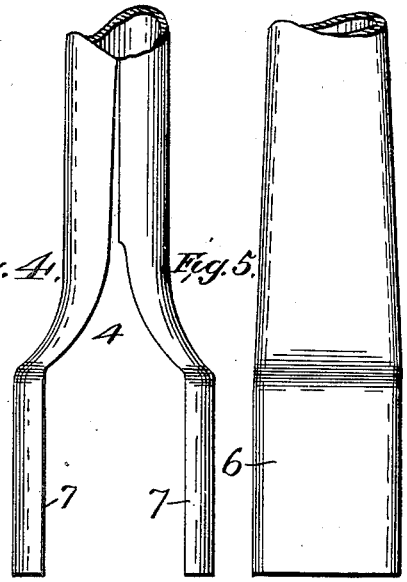
Figures 7, 8:
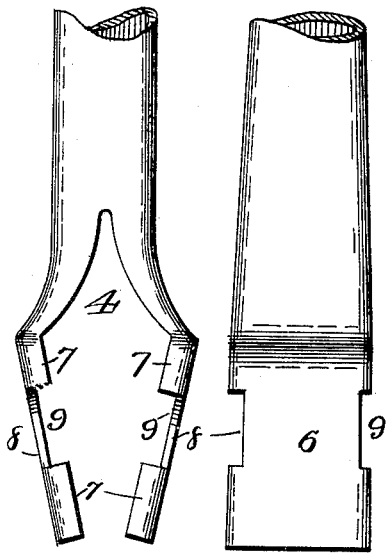
Figure 6:
Figure 15:
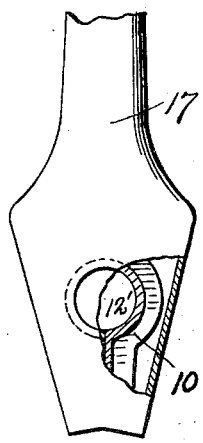
Figure 17:
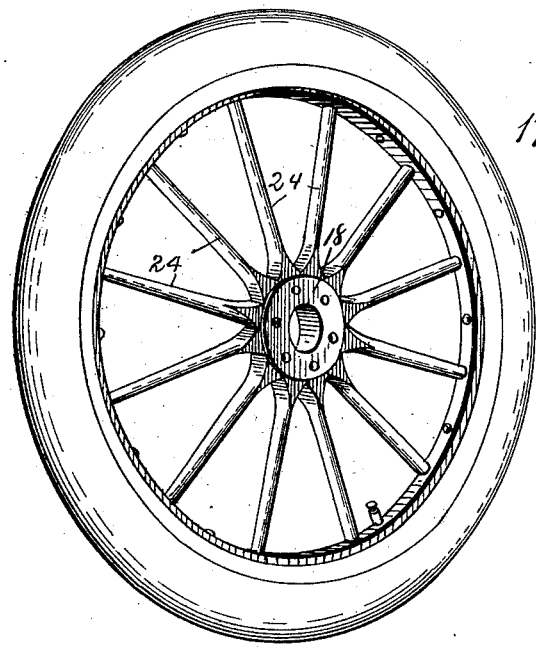
Figure 16:
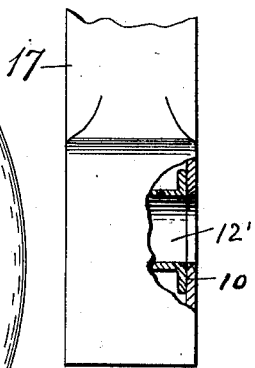
Figure 18:
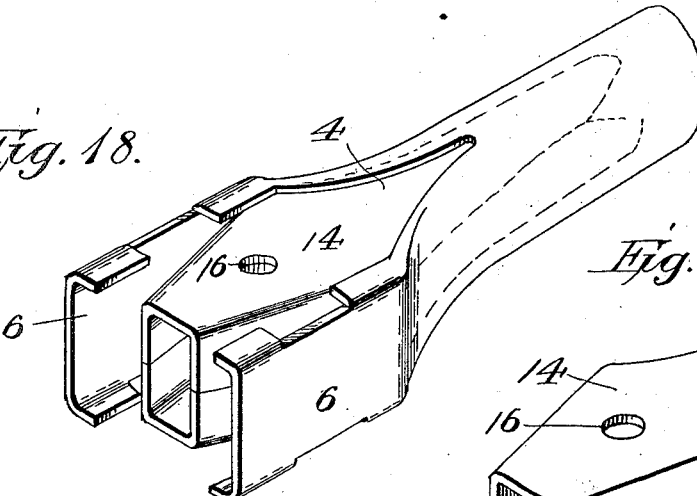

In the accompanying drawings, which form part of this specification, Figure 1 is a plan view of a blank for making tubular metallic wheel-spokes; Fig. 2, a perspective of the blank after the first or initial bending thereof; Fig. 3, a like view of the blank bent into elliptical form; Fig. 4, a side elevation of the blank, showing the head or swell partly formed; Fig. 5, a like view showing the side of the blank at a right angle to the side shown in Fig. 4; Fig. 6, an end view of the blank; Fig. 7, a side view of a spoke ready to receive its reinforce; Fig. 8, a like view showing the side of the spoke at a right angle to the side shown in Fig. 7; Fig. 9, a side elevation of the spoke with a reinforce in the head thereof; Fig. 10, a transverse section on line 10 10, Fig. 9; Fig. 11, a side elevation of one-half of the reinforces; Fig. 12, a vertical transverse section of a hub plate or disk with one of the spokes in position thereon; Fig. 13, a vertical transverse section on line 13 13, Fig. 12, showing a hub-plate on each side of the spoke; Fig. 14, a side elevation of one of the thimbles which extend through the hub-plates and the spokes; Fig. 15, a side elevation, partly in section, of a spoke having its flat sides filled or closed; Fig. 16, a like view, partly in section, showing the side at a right angle to that shown in Fig. 15; Fig. 17, a perspective of an assembled wheel without an elongated hub-section on the sides of the hub-plates; Fig. 18, a perspective of a modified construction of the reinforce applied to a spoke, and Fig. 19 a like view of one-half of the reinforce.

Reference being had to the drawings and the designating characters thereon, 1 indicates a spoke-blank of a length equal to the length of the spoke and having tapering sides 2 2 for forming a tapering spoke, and the blank is provided with a longitudinal incision 3, which extends far enough up the blank to leave a wedge-shaped opening 4 in the blank and spoke, as shown in Figs. 4, 7, 9, 12, and 18. The blank is cut out of rolled sheet-steel and placed in a suitable die, in which it receives its initial bend and assumes the U-shaped form shown in Fig. 2, and is then placed in another die and the side seam 5 approximately closed and the blank bent into elliptic form, as shown in Fig. 3. The large end of the blank is then placed in a suitable die and the large end opened to form the straight and parallel sides 6 6, their lateral flanges 7, and the wedge-shaped opening 4 on each side of the spoke-blank between and above the sides 6. The same end of the blank is then placed in another die and the sides 6 6 bent inward to form the angular sides 8 8 and cut out the notches or recesses 9 9 in the flanges 7 7. The blank has now assumed the shape of a spoke and is ready to receive the reinforce 10, which is stamped into form in a suitable die, is in two parts, each part having a neck 11, which extends up into the tubular body of the spoke, and a head in which is a transverse depression 12 to form an opening 12' through the reinforce for a bolt to assemble the spokes in a suitable hub. On the edges of the adjacent faces of the reinforce are laterally-extending flanges 13 to stiffen the reinforce and form a bearing or seat on the inside of the spoke to join the reinforce to the spoke by molten metal in a suitable brazing-bath.

Figure 19:
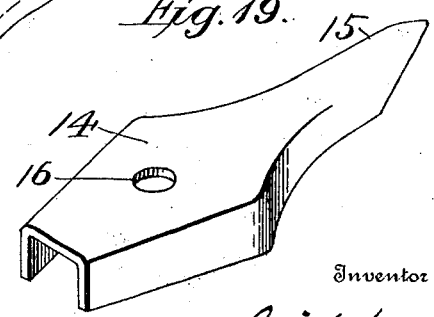

In Figs. 18 and 19 I have shown a modified construction of the reinforce, and in which it is given a wedge-shaped head 14, a neck 15 to extend up into the body of the spoke, a transverse opening 16, and after having been placed in the head of the spoke-blank, the sides 6 6 are closed down upon the angular sides of the reinforce in a suitable die.

The spokes 24 may now have their wedge-shaped openings 7 filled in and the spoke dipped in a bath of brazing metal and a spoke 17 (shown in Figs. 15 and 16) formed suitable for use in some kinds of vehicle-wheels.

18 is a hub plate or disk on which a plate of thin sheet-steel 19, having wedge-shaped projections 20, is secured, there being as many projections 20 as there are spokes in the wheel to be assembled, and in assembling the spokes the recesses 9 are made to engage the ring-like portion 21 on the plate 19 with the projections 20 over and filling the recess 4 in the spoke, as shown in Fig. 12. After the spokes have all been assembled the metal adjacent to the joints in the spokes is hammered down to make close joints and the thimbles 22 are inserted in the openings 23 in the hub-plates and pass through the openings in the reinforce, when the assembled wheel is ready for immersion in a bath of molten metal, and all the parts of the wheel thus far described are metallically joined together and form an inseparable whole. The wheel thus constructed may be finished by applying any preferred form of hub and bearings for an axle, a suitable rim or felly, and a suitable tire. The wheel thus constructed is strong and durable, capable of resisting great lateral strain and supporting great weight.

Having thus fully described my invention, what I claim is—

1. A tubular metallic wheel-spoke provided with a wedge-shaped head having a transverse reinforce therein.

2. A tubular metallic wheel-spoke provided with a wedge-shaped head having a transverse reinforce and an opening through the reinforce.

3. A tubular metallic wheel-spoke provided with a wedge-shaped head having a transverse reinforce therein metallically joined to the walls of the head.

4. A tubular metallic wheel-spoke provided with a wedge-shaped head having inwardly-projecting flanges on its sides, recesses in the flanges, and a reinforce in the head.

5. A tubular metallic wheel-spoke having an enlarged head, a reinforce in said head, and an opening extending transversely through the head.

6. A tubular metallic wheel-spoke provided with a wedge-shaped head having a transverse opening therein, and a reinforce forming a wall for said opening.

7. A tubular metallic wheel-spoke provided with a wedge-shaped head having a transverse opening therein, and a reinforce forming a wall for said opening and extending into the body of the spoke.

8. A tubular metallic wheel-spoke approximately elliptical in cross-section, provided with a wedge-shaped head having straight sides, and a transverse reinforce in said head metallically joined to the sides thereof and extending from the head into the body of the spoke.

9. A plurality of tubular metallic wheel-spokes having wedge-shaped heads; in combination with disks on the sides of the spokes and metallically joined thereto.

10. A plurality of tubular metallic wheel-spokes having wedge-shaped heads provided with reinforces, and a transverse opening; in combination with disks on the sides of the spokes and metallically joined thereto.

11. A plurality of tubular metallic wheel-spokes having heads provided with reinforces metallically joined thereto; in combination with disks metallically joined to the sides of the head.

12. A plurality of tubular metallic wheel-spokes having heads provided with transverse openings; in combination with disks having openings corresponding with the openings in the spokes, and thimbles extending through said disks and spokes, and metallically joined together.

13. A tubular metallic wheel-spoke having an enlarged head, and a transverse reinforce metallically joined to the inside of the walls of the head.

In testimony whereof I affix my signature in presence of two witnesses.

THOMAS MIDGLEY.

Witnesses:
PARNELL CULL,
CHARLES S. M. KRUMM.